United States Patent
Maeno et al.

(10) Patent No.: US 11,170,086 B2
(45) Date of Patent: Nov. 9, 2021

(54) FACE IMAGE PROCESSING METHOD AND FACE IMAGE PROCESSING DEVICE THAT NARROW A SEARCH RANGE OF FACE IMAGES UTILIZING A REGISTRATION DATABASE

(71) Applicant: PANASONIC INTELLECTUAL PROPERTY MANAGEMENT CO., LTD., Osaka (JP)

(72) Inventors: Kazuki Maeno, Kanagawa (JP); Noboru Kobayashi, Kanagawa (JP); Chie Yoshihiro, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 23 days.

(21) Appl. No.: 16/469,042

(22) PCT Filed: Sep. 15, 2017

(86) PCT No.: PCT/JP2017/033388
§ 371 (c)(1),
(2) Date: Jun. 12, 2019

(87) PCT Pub. No.: WO2018/110012
PCT Pub. Date: Jun. 21, 2018

(65) Prior Publication Data
US 2019/0311104 A1 Oct. 10, 2019

(30) Foreign Application Priority Data
Dec. 16, 2016 (JP) .............................. JP2016-244461

(51) Int. Cl.
*G06F 21/00* (2013.01)
*G06F 21/32* (2013.01)
(Continued)

(52) U.S. Cl.
CPC .............. *G06F 21/32* (2013.01); *G06F 16/51* (2019.01); *G06F 16/5854* (2019.01); *G06T 7/00* (2013.01);
(Continued)

(58) Field of Classification Search
CPC ...... G06F 21/32; G06F 16/5854; G06F 16/51; G06T 7/00; G06K 9/00288; G06K 9/00348
See application file for complete search history.

(56) References Cited

U.S. PATENT DOCUMENTS

2003/0185423 A1   10/2003   Dobashi
2005/0212654 A1   9/2005   Yoda
(Continued)

FOREIGN PATENT DOCUMENTS

EP   1696393 A2   8/2006
EP   2192559 A2   6/2010
(Continued)

OTHER PUBLICATIONS

International Search Report issued in International Patent Application No. PCT/JP2017/033388, dated Nov. 14, 2017.
(Continued)

*Primary Examiner* — Pakee Fang
(74) *Attorney, Agent, or Firm* — Greenblum & Bernstein, P.L.C.

(57) ABSTRACT

A server device that is a face image processing device includes a controller, a storage unit, an input unit, an output unit, and a registration database. The identification information of an entering person acquired at an entrance gate is transmitted to the server device and collated with the registration database by the controller, and persons related to the entering person and persons matching the entering person are included in a search range. Search load is
(Continued)

reduced, errors are suppressed, and high speed is achieved by narrowing down the search range.

16 Claims, 10 Drawing Sheets

(51) Int. Cl.
  *G06F 16/583* (2019.01)
  *G06F 16/51* (2019.01)
  *G06T 7/00* (2017.01)
  *G06K 9/00* (2006.01)
(52) U.S. Cl.
  CPC ..... *G06K 9/00288* (2013.01); *G06K 9/00348* (2013.01)

(56) References Cited

U.S. PATENT DOCUMENTS

| | | | | |
|---|---|---|---|---|
| 2006/0204050 A1* | 9/2006 | Takizawa | ........... | G06K 9/00912 382/115 |
| 2006/0228005 A1 | 10/2006 | Matsugu et al. | | |
| 2010/0134310 A1* | 6/2010 | Zheng | ..................... | G07C 9/25 340/686.6 |
| 2012/0293635 A1* | 11/2012 | Sharma | .............. | G06K 9/00234 348/50 |
| 2013/0016882 A1* | 1/2013 | Cavallini | ............... | G06K 9/629 382/117 |
| 2014/0105504 A1* | 4/2014 | Krupka | ................ | G06K 9/4661 382/195 |
| 2016/0371535 A1* | 12/2016 | Li | ...................... | G06K 9/00288 |

FOREIGN PATENT DOCUMENTS

| | | |
|---|---|---|
| JP | 2001-331801 | 11/2001 |
| JP | 2004-324183 | 11/2004 |
| JP | 2005-129016 | 5/2005 |
| JP | 2006-293644 | 10/2006 |
| JP | 2008-071366 | 3/2008 |
| JP | 2009-009588 | 1/2009 |

OTHER PUBLICATIONS

The Extended European Search Report dated Oct. 17, 2019 for the related European Patent Application No. 17880175.9.

* cited by examiner

FIG. 8
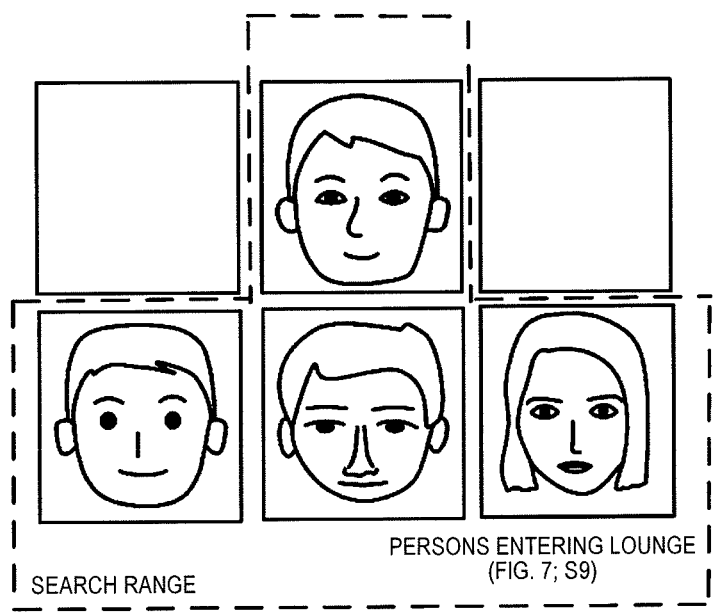
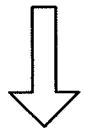
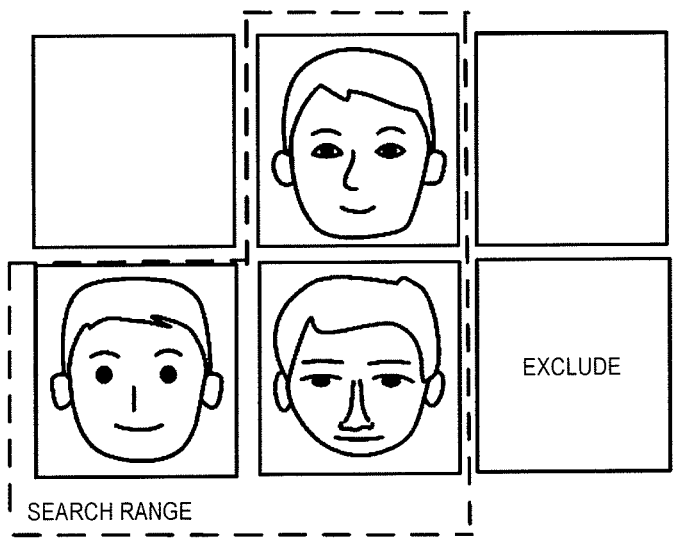

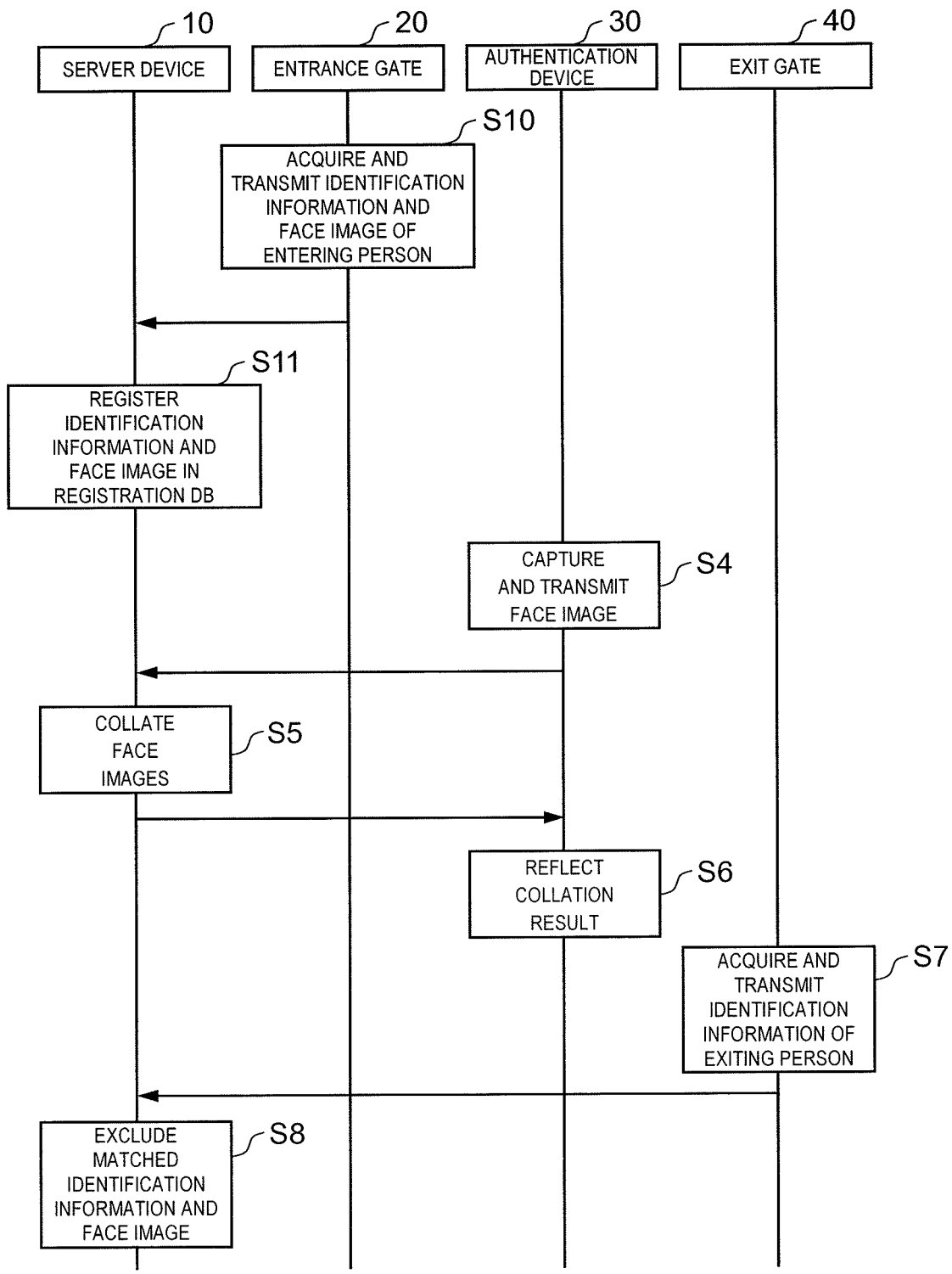

FACE IMAGE PROCESSING METHOD AND FACE IMAGE PROCESSING DEVICE THAT NARROW A SEARCH RANGE OF FACE IMAGES UTILIZING A REGISTRATION DATABASE

TECHNICAL FIELD

The present disclosure relates to a face image processing method and a face image processing device.

BACKGROUND ART

A method of verifying an identity by collating a face image captured by a camera or the like with identification information is known (see PTL 1 and PTL 2).

PTL 1 discloses an authentication system including a first imaging unit that is provided in a path through which a person to be authenticated passes and captures an image of the person to be authenticated, a first authentication unit that performs first authentication of the person to be authenticated captured by the first imaging unit, a second imaging unit that is provided at a position where the person to be authenticated passes after a position of the first imaging unit provided in the path through which the person to be authenticated passes, and a second authentication unit that authenticates the person to be authenticated by collating the image of the person to be authenticated captured by the first imaging unit with the image of the person to be authenticated captured by the second imaging unit to perform authentication efficiently.

PTL 2 discloses a gate management system that includes a wireless tag, recording an identifier of a passerby, and a camera that images the face of the passerby approaching a gate. The gate management system registers a face image of the passerby in association with the identifier in advance and performs identity verification for the passerby by collating the face image of the passerby corresponding to the identifier recognized from the wireless tag with the face image of the passerby captured by the camera. It is disclosed that to improve the security in the gate management system using wireless tags, performing identity verification twice with the identifier and the face image for the passerby who carries the wireless tag may exclude an unauthorized passerby whose identifier and the face image are different.

CITATION LIST

Patent Literature

PTL 1: Japanese Patent Unexamined Publication No. 2005-129016
PTL 2: Japanese Patent Unexamined Publication No. 2004-324183

SUMMARY OF THE INVENTION

Technical Problem

Although PTL 1 and PTL 2 are techniques relating to face image processing, since the amount of data is large in the collation processing of face images and time is required for the collation processing, there is a problem that it is not possible to quickly and accurately authenticate moving person.

It is an object of the present disclosure to provide a face image processing method and a face image processing device capable of performing face image processing at high speed.

Solution to Problem

The face image processing method of the present disclosure is a face image processing method using a registration database in which face images of persons who are permitted in advance to enter a predetermined closed space and narrowing-down information corresponding to the face images are registered. The face image processing method includes acquiring narrowing-down information corresponding to at least one of a person entering and exiting the closed space. Further, the method includes collating the narrowing-down information registered with the narrowing-down information to be acquired and determining a search range of the face images registered in the registration database based on a collation result of the narrowing-down information registered and the narrowing-down information to be acquired, the search range being search targets in authentication processing of the face image in the closed space.

The face image processing device of the present disclosure includes a registration database in which face images of persons who are permitted in advance to enter a predetermined closed space and narrowing-down information corresponding to the face images are registered and a controller, in which the controller acquires narrowing-down information corresponding to at least one of a person entering and exiting the closed space. Further, the method includes collating the narrowing-down information registered with the narrowing-down information to be acquired and determining a search range of the face images registered in the registration database based on a collation result of the narrowing-down information registered and the narrowing-down information to be acquired, the search range being search targets used in authentication processing of the face image in the closed space.

Advantageous Effects of Invention

According to the present disclosure, since there is no need to collate the face images of all the persons registered in the registration database, only the persons permitted to enter and exit the closed space are set as a search target range. This makes it possible to provide a face image processing method and a face image processing device that reduce the load on a computer in the face image authentication processing, suppress the errors in verification, and enable high-speed collation processing.

BRIEF DESCRIPTION OF DRAWINGS

FIG. 3A is a diagram showing a situation in which a person holds an air ticket along with check-in.

FIG. 8 is a schematic diagram showing a situation of limiting a search range of the face image registered in the registration database by the processing of FIG. 7.

FIG. 9 is a flowchart showing processing of acquiring and registering identification information and a face image at an entrance gate.

DESCRIPTION OF EMBODIMENT

Hereinafter, an embodiment (hereinafter, referred to as "present embodiment"), in which a face image processing method and a face image processing device according to the present disclosure are specifically disclosed, will be described in detail with reference to drawings as appropriate. However, detailed description may be omitted more than necessary. For example, there are cases where a detailed description of well-known matters and redundant description on substantially the same configuration may be omitted. This is for avoiding unnecessary redundancy of the following description and facilitating understanding by those skilled in the art. The accompanying drawings and the following description are provided to enable those skilled in the art to fully understand the present disclosure and are not intended to limit the claimed subject matters.

Hereinafter, a preferred embodiment for carrying out the present disclosure will be described in detail with reference to drawings.

Figure 1A:
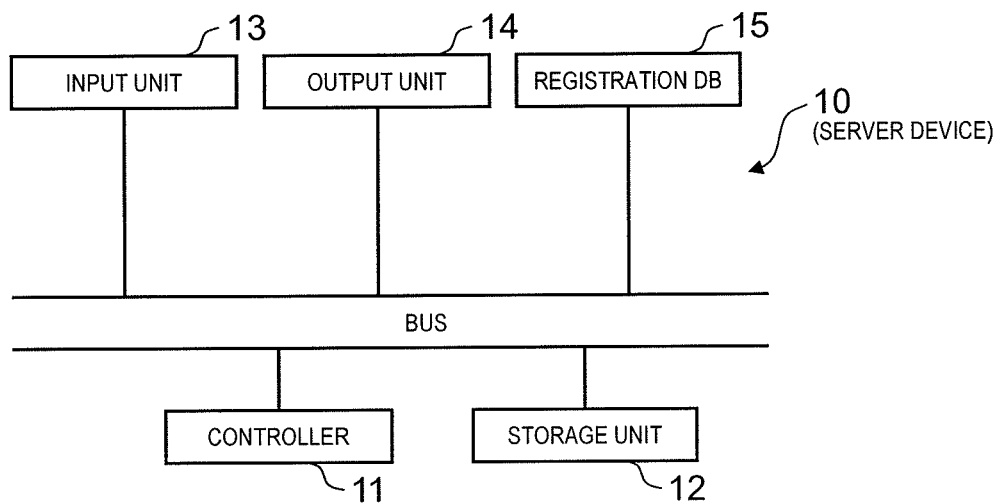
FIG. 1A is a block diagram of a server device (face image processing device) constituting a face image processing system of the present disclosure.
Figure 1B:
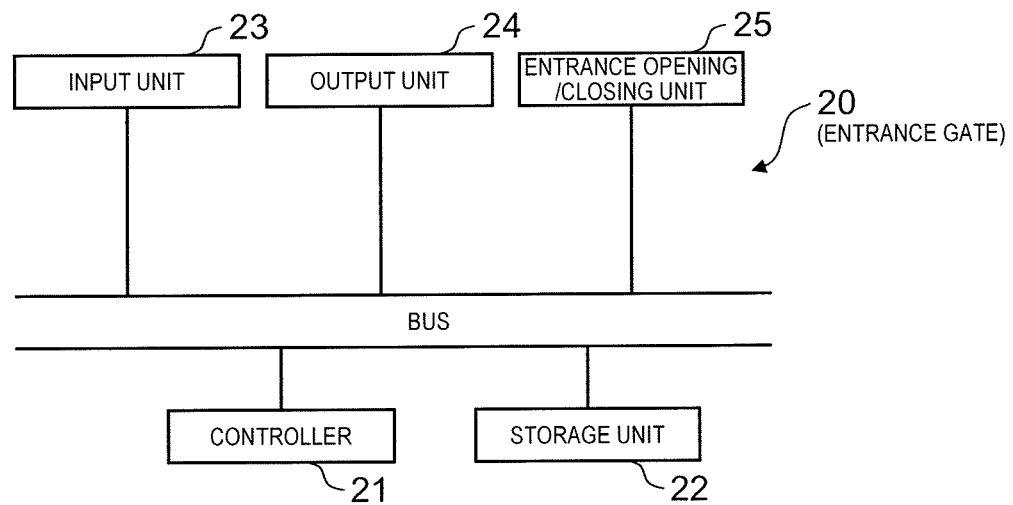
FIG. 1B is a block diagram of an entrance gate constituting the face image processing system of the present disclosure.
Figure 2A:
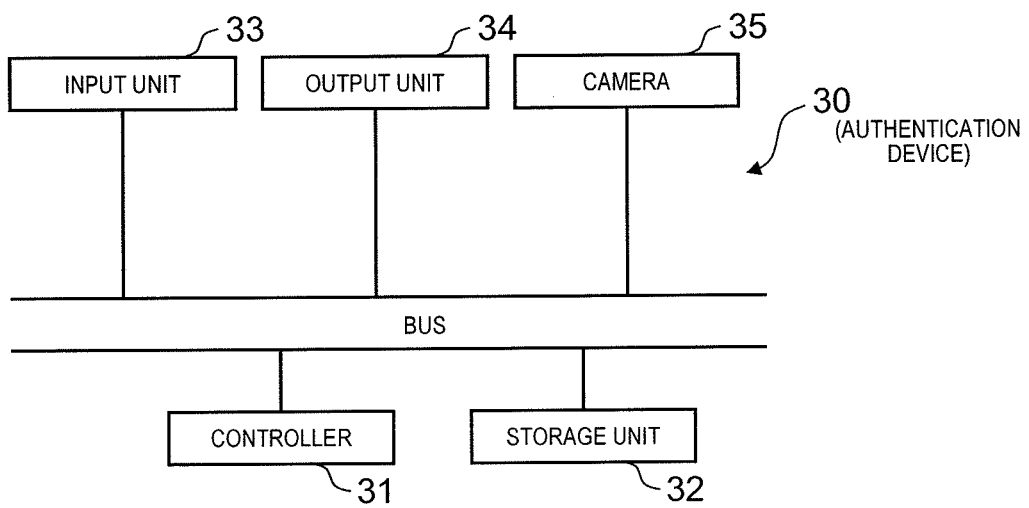
FIG. 2A is a block diagram of an authentication device constituting the face image processing system of the present disclosure.
Figure 2B:
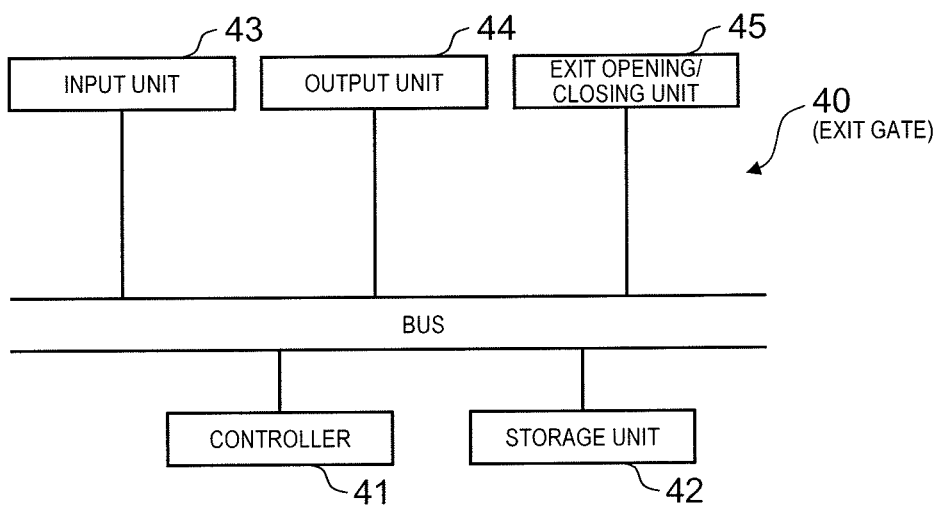
FIG. 2B is a block diagram of an exit gate constituting the face image processing system of the present disclosure.

FIGS. 1A, 1B, 2A, and 2B are block diagrams of respective portions constituting a face image processing system, FIG. 1A shows a server device, FIG. 1B shows an entrance gate, FIGS. 2A and 2B are block diagrams following FIGS. 1A and 1B, FIG. 2A is an authentication device, and FIG. 2B is an exit gate. The face image processing system and the face image processing device according to the present disclosure will be described with reference to FIGS. 1A, 1B, 2A, and 2B.

The face image processing system of the present disclosure includes server device 10 (see FIG. 1A), entrance gate 20 (see FIG. 1B), authentication device 30 (see FIG. 2A), and exit gate 40 (see FIG. 2B). Server device 10 is a host computer constituting the face image processing device forming the core of the face image processing system, and entrance gate 20, authentication device 30, and exit gate 40 are terminals or the like connected to server device 10 over a network or the like.

Entrance gate 20 acquires entering-person identification information (second identification information) of a person who enters from an ID or the like of a person entering a predetermined closed space, and authentication device 30 images the face of a person moving in the closed space, and exit gate 40 acquires exiting-person identification information of a person exiting the closed space. In addition, the predetermined closed space is a restricted area (controlled area) where a person who enters an airplane at an airport is permitted to enter after having a security check, the inside of an authentication gate of a building or the like and is a space where only people who are permitted in advance to enter may enter, but is not a space where anyone may freely enter and exit like a public space.

Server device (face image processing device) 10 includes controller 11, storage unit 12, input unit 13, output unit 14, and registration database (hereinafter, referred to as registration DB) 15. Controller 11 is a processor that totally controls entire server device 10, storage unit 12 is a memory for storing programs and necessary information, input unit 13 receives data from entrance gate 20, authentication device 30, and exit gate 40, and output unit 14 transmits data to entrance gate 20, authentication device 30, and exit gate 40. Transmission and reception with server device 10 are performed by the input unit and the output unit provided in each terminal 20, 30, and 40.

Registration DB 15 is a registration database in which identification information (first identification information) such as an ID of a person who is permitted to enter the closed space in advance and information including a face image linked to the identification information are registered. The person who is permitted to enter in advance is a member of an airline, a person who has a ticket for that day, a person who has a flight schedule for that day, a person who participates in a membership conference on that clay, and so on.

Entrance gate 20 is installed at a place included in a restricted area which is a closed space such as a reception counter, a security gate, immigration control, and the like and includes controller 21, storage unit 22, input unit 23, and output unit 24 similarly to server device 10. In addition, entrance gate 20 includes entrance opening/closing unit 25 that acquires and registers identification information including an ID card or the like of an entering person at an entrance gate, and opens and closes the entrance gate.

Authentication device 30 is installed in an entrance and the like of a special area provided further inside the closed space and includes controller 31, storage unit 32, input unit 33, and output unit 34 similarly to server device 10. In addition, authentication device 30 includes camera 35 that images the face of a person moving in the closed space. The special area is, for example, a membership lounge in a restricted area of an airport, a member-dedicated room in a closed space, a meeting room for members, a dedicated room (such as a venue and a conference room) where only participants who are preregistered may enter in a closed space, a VIP room and a floor of a hotel with restricted visitors, or the like.

Exit gate 40 is installed in, for example, a takeoff gate to get on an airplane, a reception counter, and the like and includes controller 41, storage unit 42, input unit 43, and output unit 44 similarly to server device 10. Exit gate 40 includes exit opening/closing unit 45 that acquires and registers identification information including the ID card or the like of a person exiting an exit gate, and opens and closes the exit gate.

Since controllers 21, 31, and 41, storage units 22, 32, and 42, input units 23, 33, and 43, and output units 24, 34, and 44 have the same functions as each unit of server devices 10, the description thereof is omitted.

FIGS. 3A to 3D describes an example of a situation in which a person entering a closed space (restricted area) after passing through entrance gate 20 is a pre-registered member and is entering a membership lounge in the restricted area at an airport.

When entering person 100 entering a predetermined lounge holds an air ticket whose identification information (second identification information) along with check-in is recorded to reader 26 provided in entrance opening/closing unit 25 of entrance gate 20 (see FIG. 3A), reader 26 reads the identification information of entering person 100 and opens the gate of entrance opening/closing unit 25 to permit entry of entering person 100 into the restricted area (closed space).

Figure 3A:
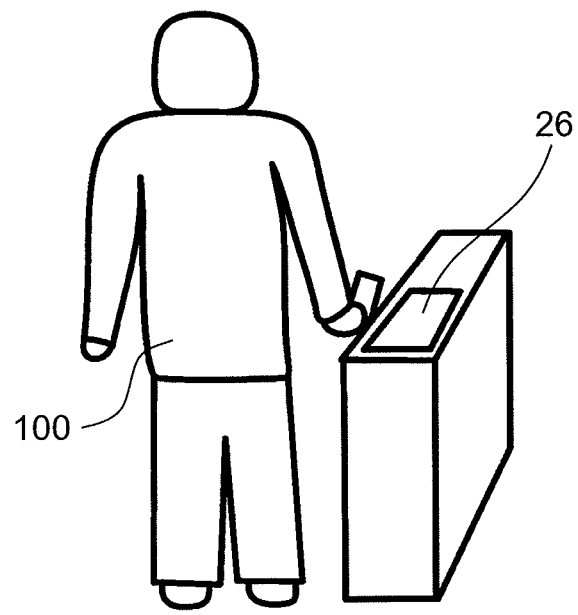
Figure 3B:
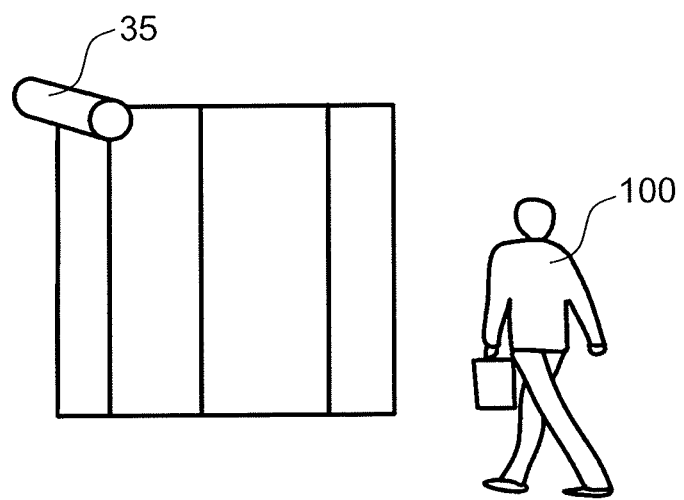
FIG. 3B is a diagram showing a situation in which a person who has entered a restricted area attempts to enter a membership lounge.
Figure 3C:
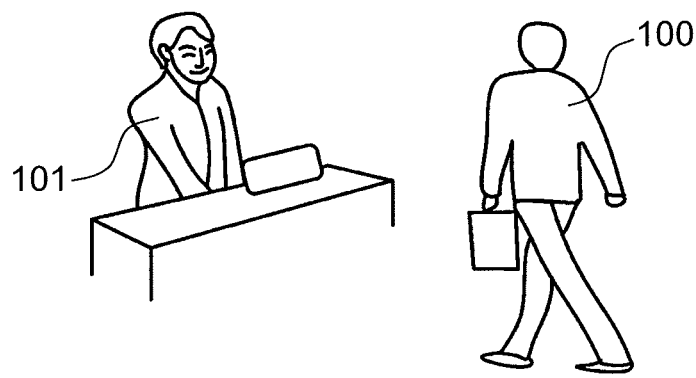
FIG. 3C is a diagram showing a situation in which a receptionist near an entrance of the membership lounge checks that the person is a valid member.
Figure 3D:
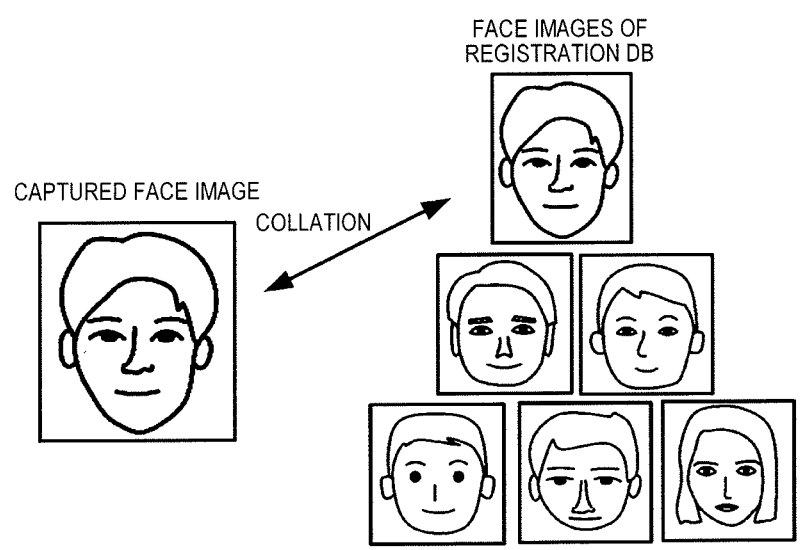
FIG. 3D is a diagram showing a situation in which a captured face image is collated with a face image registered in a registration database.

Entering person 100 who has entered the restricted area attempts to enter a membership lounge (see FIG. 3B). At this time, receptionist 101 near the entrance of the membership lounge confirms that entering person 100 is a valid member by using a terminal such as a PC provided for reception (see FIG. 3C).

Here, it is conceivable to use face authentication in order to confirm that entering person 100 is a valid member. For example, camera 35 of authentication device 30 installed in the vicinity of the entrance door or the like of the membership lounge images the face of entering person 100 (see FIG. 3B). Then, server device 10 collates the captured face image with the face image registered in registration DB 15, determines that entering person 100 is a valid member (see FIG. 3D), and notifies a determination result to a terminal such as a PC provided for reception. As a result, receptionist 101 may confirm that entering person 100 is a valid member (see FIG. 3C).

Figure 4A:
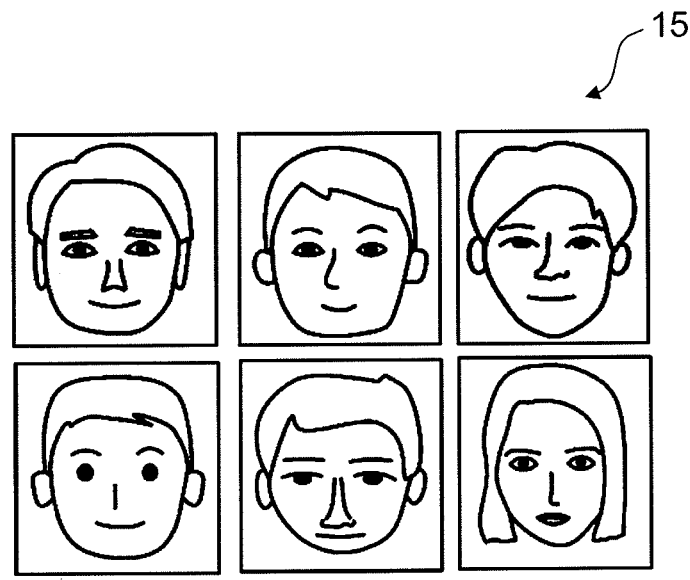
FIG. 4A is a schematic diagram of all face images registered in the registration database of the server device.
Figure 4B:
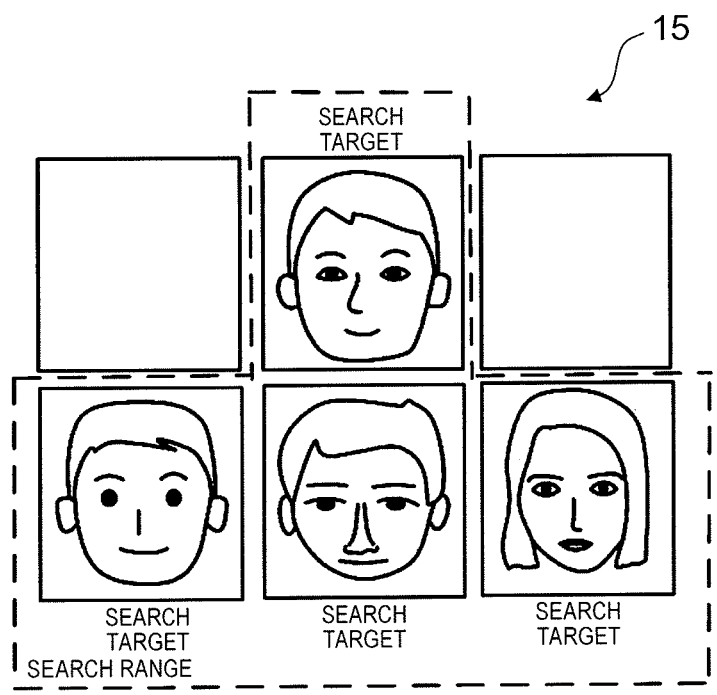
FIG. 4B is a schematic diagram of a face image whose search range is limited by a face image processing method of the present disclosure.

FIGS. 4A and 4B show face images registered in registration DB 15 in advance. FIG. 4A shows that all the face images registered in registration DB 15 are search targets when collating with the captured face image, that is, all the face images are included in a search range. Here, the determination using face authentication as described above is a useful method for improving a service, such as smooth membership guidance or the like. However, in a case where the number of face images linked with the identification information (first identification information) of the person registered in registration DB 15 is large, as shown in FIG. 4A, and entire face images are set as search targets, the capacity of the search targets becomes large, and the time required for collation may be long. In addition, the possibility that a mistake will occur at the time of determination so increases. As a result, the quality of service may be reduced.

Therefore, in the face image processing method and face image processing device of the present disclosure, for example, as shown in FIG. 4B, the processing load may be reduced and the collation time of the face images may be shortened by narrowing down a search range to only necessary face images under a predetermined condition. Since it is possible to collate face images in a short time while a plurality of entering persons (members) move in a target special area room (conference room, lounge, and the like), it is possible to reduce annoyance to entering persons. In addition, fake membership cards and impersonation entrance are prevented beforehand, thereby leading to strengthening security as well.

Figure 5:
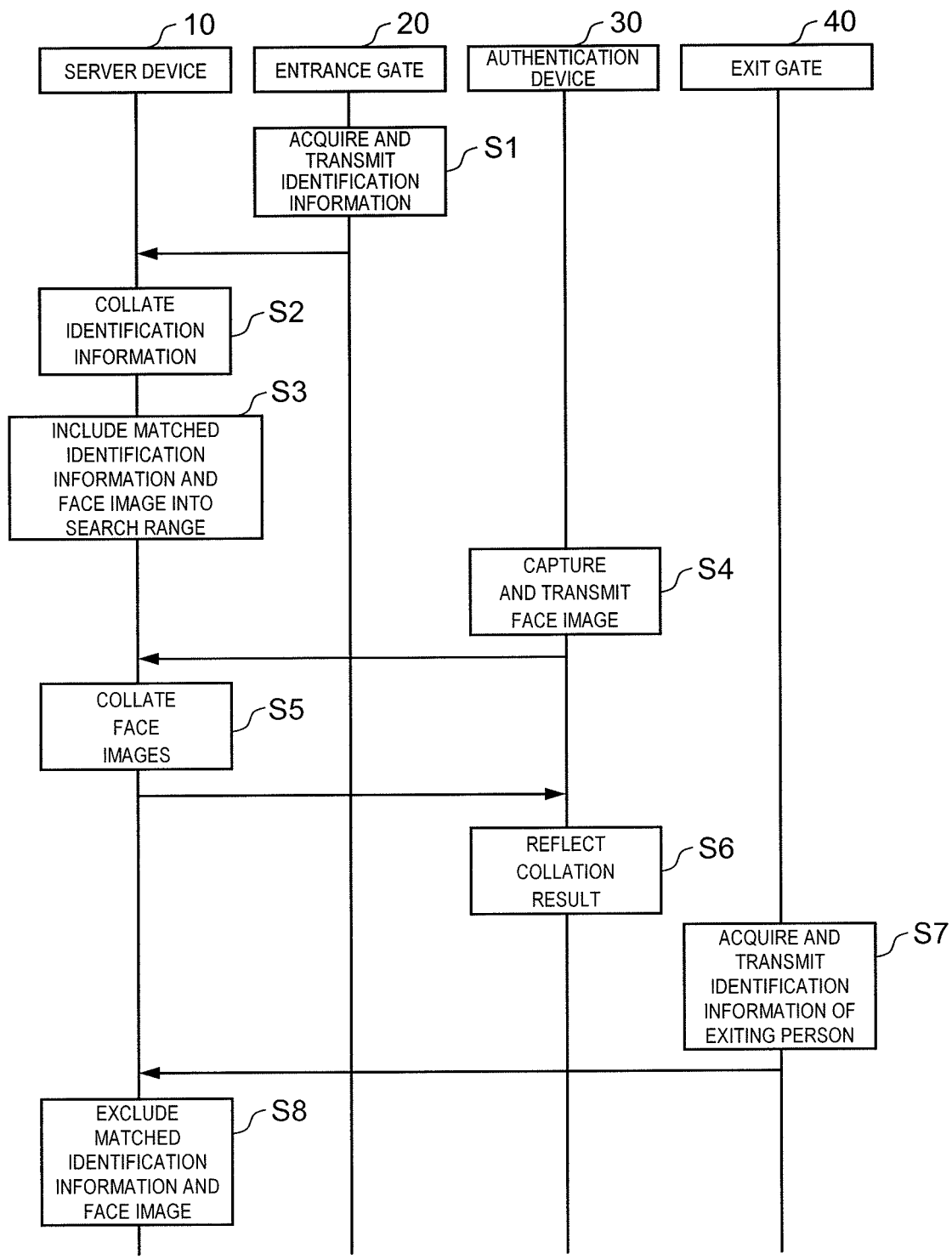
FIG. 5 is a flowchart showing an example of the face image processing method and operation of the face image processing device of the present disclosure.

FIG. 5 is a flowchart showing the procedure of narrowing down the search range of the face images by exchanging information between server device 10, entrance gate 20, authentication device 30, and exit gate 40.

Entrance gate 20 acquires identification information of an entering person and transmits the identification information (second identification information) to server device 10 via output unit 24 of entrance gate 20 and input unit 13 of server device 10 (S1). Acquisition of the identification information of an entering person may be mechanical or artificial. The acquired identification information may be temporarily registered in entrance gate 20 and then transmitted to server device 10 or may be immediately transmitted to server device 10 without being registered.

Controller 11 of server device 10 collates the identification information (second identification information) of the entering person transmitted from entrance gate 20 with the identification information (first identification information) of the individuals registered in registration DB 15 (S2). Then, as a result of the collation, as shown in FIG. 4B, controller 11 validates only the identification information and the face image of the matching person and includes the identification information and the face image into the search range as search targets (S3).

Next, it is assumed that a person enters the restricted area. The face image of a person who has passed through entrance gate 20 is captured by camera 35 of authentication device 30 and the face image is transmitted to server device 10 via output unit 24 of entrance gate 20 and input unit 13 of server device 10 (S4). Controller 11 collates face images from among the received face image and the face images for which the search range has been determined (S5).

In a case where the face image may be verified, the result is transmitted to authentication device 30, and authentication device 30 reflects the result (S6). If the person is a regular visitor, the result is, such as, the entrance door being opened, an attendant being notified of the regular visitor coming, or the like. And, in a case where the person is not a regular visitor, the result is, such as, the entrance door being not opened a security guard being notified, or the like.

Next, it is assumed that a person exits the restricted area. Exit gate 40 acquires the identification information (second identification information) of an exiting person by a predetermined reader or the like, for example when the person passes through exit gate 40, and transmits the identification information of the exiting person to server device 10 via output unit 44 of exit gate 40 and input unit 13 of server device 10 (S7).

Figure 6:
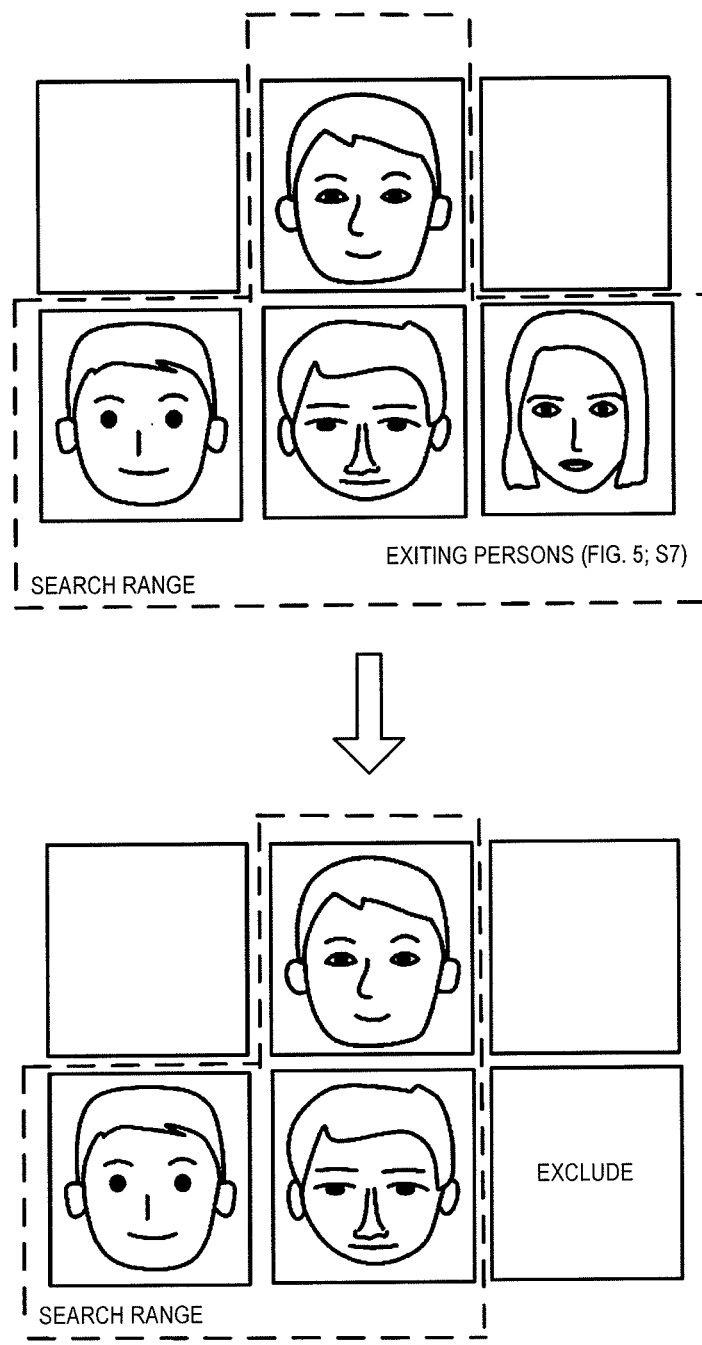
FIG. 6 is a schematic diagram showing a situation of limiting a search range of the face image registered in the registration database by the processing of FIG. 5.

Controller 11 excludes the identification information (first identification information) and the face image matching the exiting person from the search targets (S8). In this case, as shown in FIG. 6, the face image matching the exiting person is excluded from the search range shown in FIG. 4B.

According to the above flow, since it is possible to reduce the number of face images in registration DB 15 as search targets and narrow down the search range, it is possible to shorten the time of collation by controller 11 and suppress determination mistakes of collation.

Figure 7:
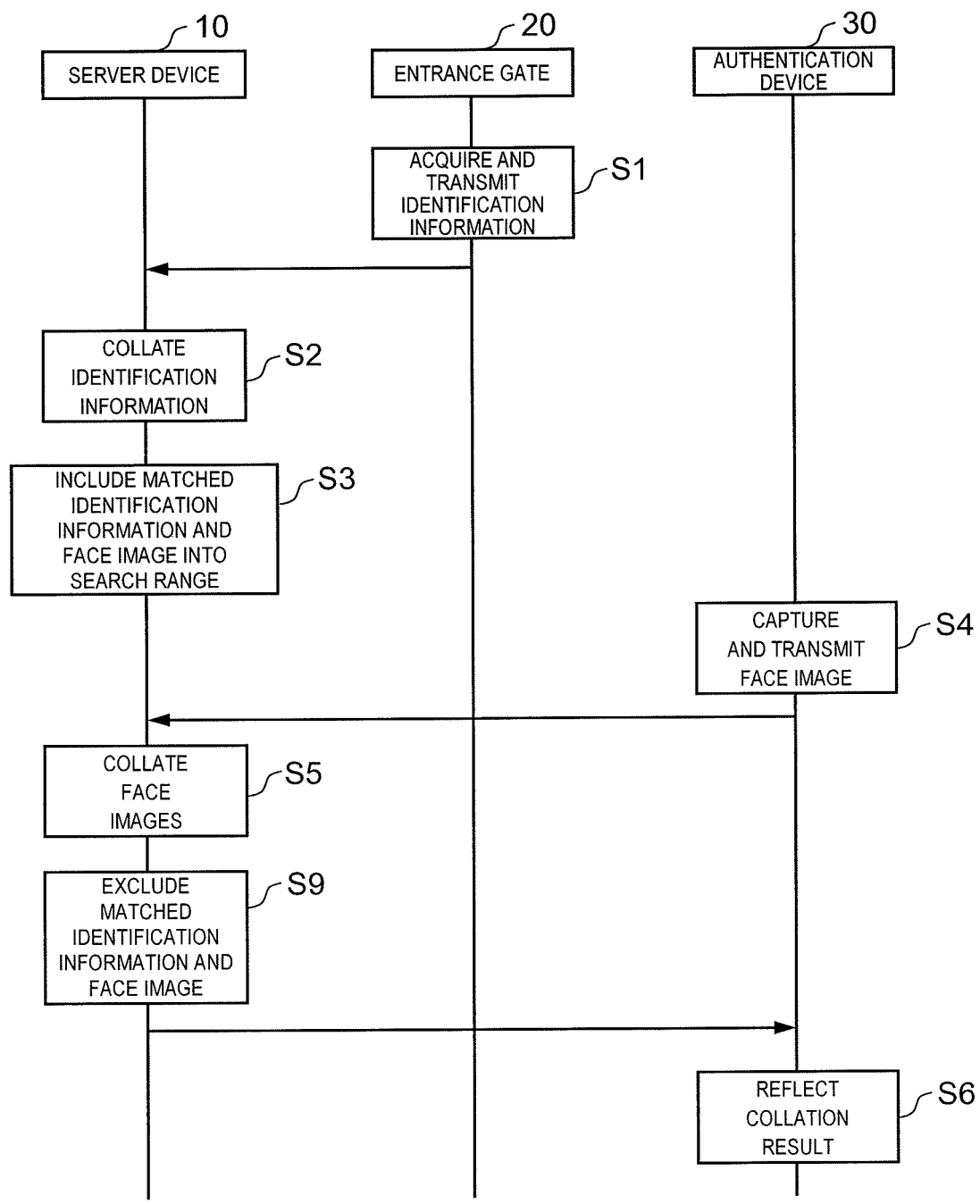
FIG. 7 is a flowchart showing another example of the face image processing method and operation of the face image processing device of the present disclosure.

FIG. 7 is a flowchart showing another procedure of narrowing down the search range of face images by exchanging information between server device 10, entrance gate 20, and authentication device 30. Steps S1 to S5 are the same as those in FIG. 5. After S5, in this example, the identification information and the face image matching the face image acquired by authentication device 30 are excluded from the search range (S9). That is, the person who has entered the membership lounge is excluded from the search targets and search range (see FIG. 8). Since it is unnecessary to subsequently authenticate the person who has once entered the restricted area such as the membership lounge and the like, there is no problem even if the person is excluded from the search target like this. In this way, even if there is no processing by exit gate 40, it is possible to obtain substantially the same effect as the processing according to the flow of FIG. 5.

In the flow of FIGS. 5 and 7, a situation in which a person has previously accessed server device 10 by using a terminal such as a PC and registered his or her own identification information in registration DB 15 in advance is assumed. FIG. 9 shows a flow of processing of registering a face image of a person, by entrance gate 20, who has not been registered in registration DB 15 in advance.

The identification information (second identification information) of a person entering entrance gate 20 is acquired, the face image of the person is simultaneously captured with the camera installed in entrance gate 20, and at the same time, the identification information and the face image are transmitted from output unit 24 of entrance gate 20 to input unit 13 of server device (S10). Controller 11 registers the identification information and the face image received by input unit 13 in registration DB 15 (S11). Subsequent operations such as an operation of capturing a face image by authentication device 30 and reflecting the result of collation and the like are the same as the examples in FIGS. 4A and 4B.

For example, a passenger who has chosen a business class for the flight of that day may use the lounge, and a person who is not registered in registration DB 15 may also use a predetermined closed space. By temporarily including the person in the search range of the registration DB and collating face images and invalidating the data after the person exits, it is possible to reduce the load of the face image collation processing and achieve high speed.

As described above, the face image processing method of the present embodiment is a face image processing method using a registration database in which a face image of a person permitted to enter a predetermined closed space in advance and the first identification information corresponding to the face image are registered, and second identification information for identifying at least one of a person entering and exiting the closed space is acquired. Then, the first identification information and the second identification information are collated, and a search range of face images registered in the registration database as search targets is determined in authentication processing of a face image in the closed space based on a collation result of the first identification information and the second identification information.

Thereby, since there is no need to collate the face images of all the persons registered in the registration database, and only the persons who enter and exit the closed space are set as a search target range, it is possible to reduce the load on a computer in the face image authentication processing, suppress the errors in verification, and enable high-speed authentication processing. Particularly, it is possible to promptly attend an important customer such as a member, to improve the service, on the other hand, the identification of non-members and the like is performed promptly, and the enhancement of security is improved.

As described above, in the face image processing method of the present embodiment, the second identification information is entering-person identification information corresponding to a person entering the closed space, and the first identification information matching the entering-person identification information and a face image corresponding to the first identification information are included in the search range. As a result, since only the persons who enter are search targets, it is possible to reduce the search load, suppress errors, and achieve high speed.

As described above, in the face image processing method of the present embodiment, the second identification information is exiting-person identification information corresponding to a person exiting the closed space, and the first identification information matching the exiting-person identification information and a face image corresponding to the first identification information are excluded from the search range. As a result, it is possible to save the amount of accumulated data and to speed up the authentication of a face image by excluding the exiting person from the search range.

As described above, in the face image processing method of the present embodiment, in a case where the first identification information matching the second identification information of a person who has entered the closed space and a face image corresponding to the first identification information are included in the search range and exit from the closed space of the person who has entered the closed space is detected, the first identification information and the face image included in the search range are excluded from the search range. As a result, it is possible to constantly save the amount of data of the search range and to speed up the face image authentication by including a matching person in the registration DB in the search range and excluding the person from the search range when the person has exited.

As described above, in the face image processing method of the present embodiment, in a case where the first identification information matching the second identification information of a person who has entered the closed space and a face image corresponding to the first identification information are included in the search range and the first identification information and the face image included in the search range are authenticated in the face image authentication processing in the closed space, the first identification information and the face image included in the search range are invalidated. As a result, it is possible to constantly save the amount of data of the search range and to speed up the face image authentication by including a matching person in the registration DB in the search range and invalidating the person from the search range when the person has exited.

As described above, the face image processing device of the present embodiment includes registration DB 15 for registering a face image of a person permitted to enter the predetermined closed space in advance and the first identification information corresponding to the face image and controller 11, and controller 11 acquires the second identification information for identifying at least one of a person entering and exiting the closed space, collates the first identification information with the second identification information, and determines a search range of the face images registered in registration DB 15 as search targets in the face image authentication processing in the closed space based on a collation result of the first identification information and the second identification information.

Thereby, since there is no need to collate the face images of all the persons registered in the registration database, and only the persons who enter and exit the closed space are set as a search target range, it is possible to provide a face image processing device that reduces the load on a computer in the face image authentication processing, suppresses the errors in verification, and enables high-speed collation processing. Particularly, it is possible to promptly attend an important customer such as a member, to improve the service, on the other hand, the identification of non-members and the like is performed promptly, and the enhancement of security is improved.

In the above-described embodiment, the face image processing device (server device 10) cooperates with both entrance gate 20 and exit gate 40 to determine the search range of face images at both the time of entry to the closed space and the time of exit from the closed space. However, the face image processing device according to the present disclosure does not necessarily need to determine the search range at both points in time and may determine the search range at least either at the time of entry or exit. By determining the search range at any point in time, it is possible to reduce the burden of searching for face images.

The embodiment of the face image processing method and the face image processing device according to the present disclosure has been described above with reference to drawings, but the present disclosure is not limited to this example. Within the category described in the claims, it will be apparent to those skilled in the art that various changed examples, modification examples, substitution examples, addition examples, deletion examples or equivalent examples may be conceived, and it should be understood that such examples naturally belong to the technical scope of the present disclosure.

For example, the following modification example is conceivable.

In the above embodiment, the search range of face images as search targets is narrowed down based on the collation result of the identification information acquired from an ID or the like, but the search range may be narrowed down by using other information. As an example of other information, it is conceivable to use a specific voice, a gait of a person to be authenticated, a predetermined movement, a password, and the like (in the present disclosure, these pieces of information and identification information are collectively referred to as "narrowing-down information").

Basically, the operation of narrowing down the search range by using voice or the like may be realized by replacing "identification information" with "voice and the like" in FIG. 5 or 7. As an example, in FIG. 5 or 7, an operation in the case where voices "clear" and "open" are associated in place of identification information will be described.

In this case, in registration DB 15, each face image is associated with one of "clear" and "open" voices. That is, in registration DB 15, a first group consisting of one or more face images associated with a voice "clear" and a second group consisting of one or more face images associated with a voice "open" are registered.

Entrance gate 20 acquires a voice from the person to be authenticated via input unit 13 and transmits the voice to server device 10 (a modification of S1 in FIG. 5 or 7). Controller 11 of server apparatus 10 collates the voice transmitted from entrance gate 20 with the information of the voice registered in the registration DB (a modification of S2 in FIG. 5 or 7). Then, as a result of the collation, controller 11 includes only the identification information and the face image of the person associated with the voice matching the voice transmitted from entrance gate 20 in the search range. For example, in a case where the voice "clear" is transmitted from entrance gate 20, the search range is limited to the face images belonging to the first group.

The subsequent operations are basically the same as the example in FIG. 5 or 7. However, with voices such as "clear" or "open", it is difficult to identify each person to be authenticated even though the group of persons to be authenticated may be identified, and as a result, it is difficult to identify an exiting person in step S7 of FIG. 5. Therefore, in a case where voices or the like are used as the narrowing-down information, an exiting person may be identified by using the first identification information. However, in a case where there is a high possibility that the person to be authenticated and the narrowing-down information are associated with each other in a one-to-one manner, such as highly accurate voice print analysis and gait analysis, identification of an exiting person may also be performed by voice or the like.

In addition, the correspondence between the voices or the like and each face image may be registered by the same operation as the operation in FIG. 9. That is, in step S10 of FIG. 9, the voices or the like and the face image of the person to be authenticated may be acquired instead of the second identification information and transmitted to the server device, and in step S 11, the acquired voice or the like and the face image may be recorded in registration DB 15 in association with each other.

In addition, in a case where information such as voices like "clear" and "open" is associated with a plurality of person to be authenticated, it is possible to omit inputs from the person to be authenticated. That is, the system may automatically determine the information to be assigned to each person to be authenticated and notify the person to be authenticated of the information at entrance gate 30. In this modification example, because voices and the like are used to determine a group to be a search range, correspondence between voices and the like and the person to be authenticated is not important. Therefore, the system may randomly determine the voices and the like to be assigned to each person to be authenticated.

In addition, in this modification example, narrowing down is performed by using prescribed voices such as "clear" and "open", but any voices may also be used. For example, if the information of the voiceprint of the person to be authenticated is registered in association with each face image in the registration DB, face images corresponding to similar voices may be narrowed down by voiceprint analysis of the acquired voice.

In addition, the narrowing-down information does not need to be limited to one type of information, such as identification information or voices. The search range may be narrowed down by a combination of plural types of pieces of narrowing-down information.

INDUSTRIAL APPLICABILITY

The face image processing method and face image processing device of the present disclosure are useful for a network system that reduces the load of searching and performs face image processing quickly.

REFERENCE MARKS IN THE DRAWINGS

10 SERVER DEVICE (FACE IMAGE PROCESSING DEVICE)
11 CONTROLLER
12 STORAGE UNIT
13 INPUT UNIT
14 OUTPUT UNIT
15 REGISTRATION DATABASE (REGISTRATION DB)
20 ENTRANCE GATE

25 ENTRANCE OPENING/CLOSING UNIT
30 AUTHENTICATION DEVICE
35 CAMERA
40 EXIT GATE
45 EXIT OPENING/CLOSING UNIT

The invention claimed is:

1. A face image processing method using a registration database in which face images of persons who are permitted in advance to enter a predetermined closed space and identification information corresponding to each of the face images are registered in association with each other, the registered identification information identifying each of the persons who are permitted in advance to enter the predetermined closed space and not including the face images, the method comprising:
   acquiring identification information of at least one of a person entering and exiting the predetermined closed space, the acquired identification information not including a face image of the person;
   performing authentication processing by collating the registered identification information with the acquired identification information; and
   determining a search range of the face images registered in the registration database based on a collation result of the registered identification information and the acquired identification information, the search range being search targets used in authentication processing of the face image of at least one of the person entering and exiting an area provided inside the predetermined closed space,
   wherein the predetermined closed space is a space where a person who fails in the authentication processing by the collation of the acquired identification information and the registered identification information, is prohibited to enter.

2. The face image processing method of claim 1,
   wherein the acquired identification information is entering-person identification information of the person entering the predetermined closed space, and
   the registered identification information that matches the entering-person identification information and the face image corresponding to the registered identification information that matches the entering-person identification information are included in the search range.

3. The face image processing method of claim 1,
   wherein the acquired identification information is exiting-person identification information of the person exiting the predetermined closed space, and
   the registered identification information that matches the exiting-person identification information and the face image corresponding to the registered identification information that matches the exiting-person identification information are excluded from the search range.

4. The face image processing method of claim 1,
   wherein the registered identification information that matches the acquired identification information of the person who has entered the predetermined closed space and the face image corresponding to the registered identification information that matches the acquired identification information of the person who has entered the predetermined closed space are included in the search range, and
   the registered identification information and the face image included in the search range are excluded from the search range in a case where exit from the predetermined closed space by the person who has entered the predetermined closed space is detected.

5. The face image processing method of claim 1,
   wherein the registered identification information that matches the acquired identification information of the person who has entered the predetermined closed space and the face image corresponding to the registered identification information that matches the acquired identification information of the person who has entered the predetermined closed space are included in the search range, and
   the registered identification information and the face image included in the search range are excluded from the search range in a case where the registered identification information and the face image included in the search range are authenticated in the face image authentication processing in the predetermined closed space.

6. The face image processing method according to claim 1, wherein the predetermined closed space includes a controlled area in an airport where a person who enters an airplane at the airport is permitted to enter after having a security check.

7. The face image processing method according to claim 1, wherein the registered identification information and the acquired identification information are a person's ID.

8. The face image processing method according to claim 1, wherein
   at an entrance of the predetermined closed space, a face image of a person entering the predetermined closed space is not acquired before the person enters the predetermined closed space, and
   a face image of a person who has entered the predetermined closed space is acquired in the predetermined closed space, and the acquired face image is collated with the face images in the search range in the face image authentication processing, before the person enters the area provided inside the predetermined closed space.

9. A face image processing device comprising:
   a registration database in which face images of persons who are permitted in advance to enter a predetermined closed space and identification information corresponding to each of the face images are registered in association with each other, the registered identification information identifying each of the persons who are permitted in advance to enter the predetermined closed space and not including the face images; and
   a controller,
   wherein the controller
      acquires identification information of at least one of a person entering and exiting the predetermined closed space, the acquired identification information not including a face image of the person,
      performs authentication processing by collating the registered identification information with the acquired identification information, and
      determines a search range of face images registered in the registration database based on a collation result of the registered identification information and the acquired identification information, the search range being search targets in authentication processing of the face image of at least one of the person entering and exiting an area provided inside the predetermined closed space,
   wherein the predetermined closed space is a space where a person who fails in the authentication processing by the collation of the acquired identification information and the registered identification information, is prohibited to enter.

10. The face image processing device of claim 9,
wherein the acquired identification information is entering-person identification information of a person entering the predetermined closed space, and
the controller includes the registered identification information that matches the entering-person identification information and the face image corresponding to the registered identification information that matches the entering-person identification information in the search range.

11. The face image processing device of claim 9,
wherein the acquired identification information is exiting-person identification information of the person exiting the predetermined closed space, and
the controller excludes the registered identification information that matches the exiting-person identification information and the face image corresponding to the registered identification information that matches the exiting-person identification information from the search range.

12. The face image processing device of claim 9,
wherein the controller
includes the registered identification information that matches the acquired identification information of the person who has entered the predetermined closed space and the face image corresponding to the registered identification information that matches the acquired identification information of the person who has entered the predetermined closed space in the search range, and
excludes the registered identification information and the face image included in the search range from the search range in a case where exit from the predetermined closed space by person who has entered the predetermined closed space is detected.

13. The face image processing device of claim 9,
wherein the controller
includes the registered identification information that matches the acquired identification information of the person who has entered the predetermined closed space and the face image corresponding to the registered identification information that matches the acquired identification information of the person who has entered the predetermined closed space in the search range, and
excludes, from the search range, the registered identification information and the face image included in the search range in a case where the first identification information and the face image included in the search range are authenticated in the face image authentication processing in the predetermined closed space.

14. A face image processing method using a registration database in which face images of persons who are permitted in advance to enter a predetermined closed space and narrowing-down information corresponding to the face images are registered in association with each other, the registered narrowing-down information defining the persons who are permitted in advance to enter the predetermined closed space and from not including the face images, the method comprising:
acquiring narrowing-down information of at least one of a person entering and exiting the predetermined closed space, the acquired narrowing-down information not including a face image of the person;
performing authentication processing by collating the registered narrowing-down information with the acquired narrowing-down information; and
determining a search range of the face images registered in the registration database based on a collation result of the registered narrowing-down information registered and the acquired narrowing-down information, the search range being search targets used in authentication processing of the face image of at least one of the person entering and exiting an area provided inside the predetermined closed space,
wherein the predetermined closed space is a space where a person who fails in the authentication processing by the collation of the acquired narrowing-down information and the registered narrowing-down information, is prohibited to enter.

15. The face image processing method of claim 14,
wherein the narrowing-down information is registered in association with a group of face images, and
the search range of the face images is limited to a group of face images corresponding to the acquired narrowing-down information.

16. The face image processing method of claim 15,
wherein the narrowing-down information includes at least one of a specific voice, a gait of a person to be authenticated, a predetermined action, and a password.

* * * * *